United States Patent

Hoang

(10) Patent No.: US 9,145,979 B2
(45) Date of Patent: Sep. 29, 2015

(54) GATE VALVE ROTARY ACTUATOR

(75) Inventor: Loc Gia Hoang, Houston, TX (US)

(73) Assignee: Cameron International Corporation, Houston, TX (US)

(*) Notice: Subject to any disclaimer, the term of this patent is extended or adjusted under 35 U.S.C. 154(b) by 639 days.

(21) Appl. No.: 12/663,414

(22) PCT Filed: Jun. 9, 2008

(86) PCT No.: PCT/US2008/066311
§ 371 (c)(1),
(2), (4) Date: Dec. 7, 2009

(87) PCT Pub. No.: WO2008/157112
PCT Pub. Date: Dec. 24, 2008

(65) Prior Publication Data
US 2010/0171056 A1 Jul. 8, 2010

Related U.S. Application Data

(60) Provisional application No. 60/934,251, filed on Jun. 12, 2007.

(51) Int. Cl.
*F16K 31/50* (2006.01)
*F16K 3/02* (2006.01)
(Continued)

(52) U.S. Cl.
CPC ............ *F16K 31/508* (2013.01); *F16K 3/0254* (2013.01); *F16K 31/04* (2013.01); *F16K 31/445* (2013.01)

(58) Field of Classification Search
CPC ....... F16K 31/04; F16K 31/014; F16K 31/05; F16K 31/445; F16K 31/508; F16K 3/0254
USPC ............. 251/129.11, 89, 264, 269, 274, 326, 251/327
See application file for complete search history.

(56) References Cited

U.S. PATENT DOCUMENTS 2,222,699 A * 11/1940 Ball ............................ 74/89.38
2,403,092 A * 7/1946 Lear ............................ 74/89.26
3,908,959 A * 9/1975 Fichtner ................... 251/129.11
(Continued)

FOREIGN PATENT DOCUMENTS

JP 53103935 A 9/1978
JP 1085581 6/1989
(Continued)

OTHER PUBLICATIONS

Written Opinion for Singapore Application No. 200907084-8, May 24, 2010 (9 p.).
(Continued)

*Primary Examiner* — Marina Tietjen
(74) *Attorney, Agent, or Firm* — Chamberlain Hrdlicka

(57) ABSTRACT

A valve actuator comprising a screw member coupled to a valve stem and a sleeve such that rotation of the sleeve causes translation of the valve stem. The sleeve has a first end that is rotatably coupled to a housing that is fixably coupled to a valve body and a second end that projects out of the housing. The valve stem is partially disposed within the sleeve and extends into the valve body. A transmission is coupled to the housing and engaged with the sleeve. A motor is coupled to the transmission so that operation of the motor causes rotation of the sleeve.

21 Claims, 5 Drawing Sheets

(51) Int. Cl.
*F16K 31/04* (2006.01)
*F16K 31/44* (2006.01)

(56) References Cited

U.S. PATENT DOCUMENTS

| | | | | |
|---|---|---|---|---|
| RE29,322 E | * | 7/1977 | Nelson | 251/14 |
| 4,338,961 A | * | 7/1982 | Karpenko | 137/243.2 |
| 4,436,278 A | * | 3/1984 | Smith | 251/129.03 |
| 5,024,124 A | * | 6/1991 | Popov et al. | 74/625 |
| 5,295,907 A | * | 3/1994 | Akkerman | 464/37 |
| 5,983,743 A | * | 11/1999 | McGregor et al. | 74/89.23 |
| 6,981,428 B2 | * | 1/2006 | Donald et al. | 74/89.26 |
| 7,017,882 B2 | * | 3/2006 | Marsh et al. | 251/77 |
| 2004/0155219 A1 | * | 8/2004 | McCarty | 251/357 |

FOREIGN PATENT DOCUMENTS

| | | |
|---|---|---|
| JP | 2072500 | 6/1990 |
| JP | 2002115748 A | 4/2002 |

OTHER PUBLICATIONS

PCT/US2008/066311 International Search Report, Oct. 20, 2008.

* cited by examiner

GATE VALVE ROTARY ACTUATOR

CROSS-REFERENCE TO RELATED APPLICATIONS

This application is a 35 U.S.C. §371 national stage application of PCT Application No. PCT/US2008/066311, filed 9 Jun. 2008, and entitled "Gate Valve Rotary Actuator," hereby incorporated herein by reference, which claims the benefit of U.S. Provisional Application No. 60/934,251, filed 12 Jun. 2007, and entitled "Gate Valve Rotary Actuator," hereby incorporated herein by reference.

STATEMENT REGARDING FEDERALLY SPONSORED RESEARCH OR DEVELOPMENT

Not Applicable.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that the following statements are to be read in this light, and not as admissions of prior art.

The present invention relates generally to valve actuators. More specifically, the present invention, in accordance with certain embodiments, relates to actuators for subsea or surface high-pressure, large diameter gate valves. As one example, the present invention relates to a combination of a rotary actuator and a high-efficiency mechanical device that converts the rotary motion to linear motion so as to actuate a gate valve.

Increasing performance demands for subsea hydrocarbon production systems have led to a demand for high-performance control systems to operate subsea pressure control equipment, such as valves and chokes. Traditionally, pressure control equipment rely on hydraulic actuators for operation. Hydraulic actuators receive pressurized hydraulic fluid from a direct hydraulic control system or an electrohydraulic control system, for example. Direct hydraulic control systems provide pressurized hydraulic fluid directly from the control panel to the subsea valve actuators. Electrohydraulic control systems utilize electrical signals transmitted to an electrically actuated valve manifold that controls the flow of hydraulic fluid to the hydraulic actuators of the pressure control equipment.

The performance of both direct hydraulic and electrohydraulic control systems is affected by a number of factors, including the water depth in which the components operate, the distance from the facility controlling the operation, and a variety of other constraints. Thus, as water depth and field size increases, the limits of hydraulic control systems, whether hydraulic or electrohydraulic, become an increasing issue. Further, even when the use of a hydraulic control system is technically feasible, the cost of the system may preclude its use in a smaller or marginal field.

In order to provide an alternative to hydraulic control systems, full electrical control systems, including fully electric actuators, have been developed. Instead of relying on pressurized hydraulic fluid to actuate the pressure control components, electrical actuators are supplied with an electric current. The reliance on electric current can allow for improved response times, especially over long distances and/or in deep water.

Thus, there remains a need to develop methods and apparatus for allowing operation of subsea actuators that overcome some of the foregoing difficulties while providing more advantageous overall results.

SUMMARY OF THE PREFERRED EMBODIMENTS

Certain exemplary embodiments of the present invention are directed toward methods and apparatus for actuating a gate valve using a rotary motor. As one example, a valve actuator comprises a screw member coupled to a valve stem and a sleeve such that rotation of the sleeve causes translation of the valve stem. The sleeve has a first end that is rotatably coupled to a housing that is fixably coupled to a valve body and a second end that projects out of the housing. The valve stem is partially disposed within the sleeve and extends into the valve body. A transmission is coupled to the housing and engaged with the sleeve. A motor is coupled to the transmission so that operation of the motor causes rotation of the sleeve.

Thus, the present invention comprises a combination of features and advantages that enable it to overcome various problems of prior devices. The various characteristics described above, as well as other features, will be readily apparent to those skilled in the art upon reading the following detailed description of certain exemplary embodiments of the invention, and by referring to the accompanying drawings.

BRIEF DESCRIPTION OF THE DRAWINGS

For a more detailed description of exemplary embodiments of the present invention, reference will now be made to the accompanying drawings, wherein.

DETAILED DESCRIPTION OF THE PREFERRED EMBODIMENTS

Figure 1:
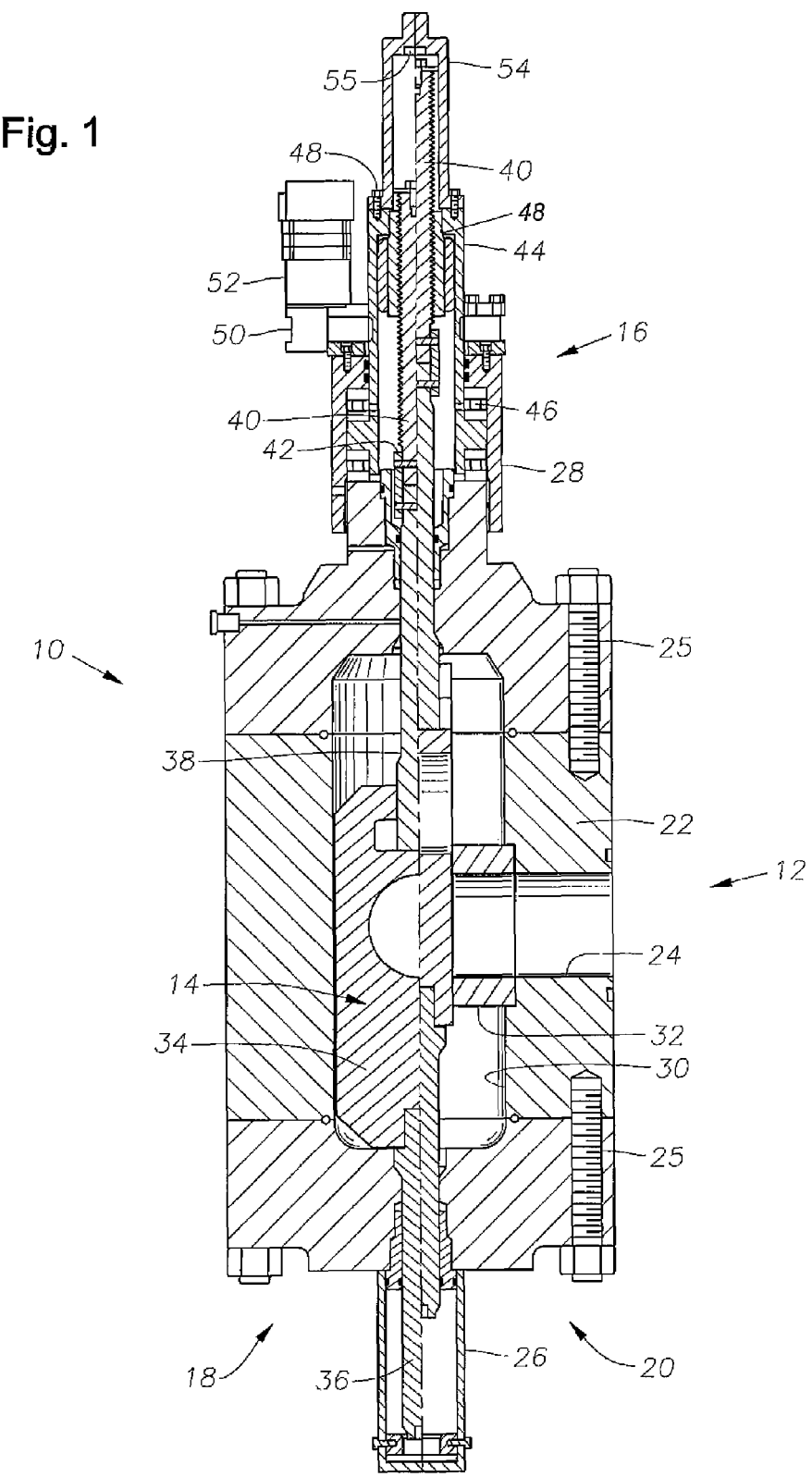
FIG. 1 is a partial sectional view of a valve assembly comprising a balance stem and constructed in accordance with embodiments of the invention.

Referring now to FIG. 1, an exemplary valve system 10 is illustrated. Such valve systems are employed to control fluid flow among various oilfield components. As one example, valve system 10 can be employed to control flow with respect to a Christmas tree, a production manifold assembly, a fluid processing assembly, a blow out preventer, to name but a few pieces of equipment. The illustrated valve system 10 comprises valve body 12, closure assembly 14, and actuator system 16. Closure assembly 14 is shown in an open position on the left half 18 of FIG. 1 and in a closed position on the right half 20 of FIG. 1. The two halves of FIG. 1 are also shown ninety degrees opposed. Valve body 12 comprises body 22 held together by cavity closures 25 and having bore 24 extending therethrough. Coupled to one end of body 22 is stem cover 26. Stationary housing 28 is coupled to the opposite end of body 22. Closure assembly 14 comprises closure member 34 and valve seat 32, both of which are disposed within valve cavity 30 in body 22. Balance stem 36 and actuator stem 38 are coupled to opposite ends of closure member 34 and extend through body 22.

Actuator system 16 is coupled to stationary housing 28 and comprises threaded stem 40, coupling 42, rotating sleeve 44, bearings 46, threaded member 48, transmission 50, motor 52, and stem housing 54. Threaded stem 40 is connected to actuator stem 38 by coupling 42. Threaded stem 40 is engaged with threaded member 48, which is rotationally fixed (i.e., does not rotate) relative to rotating sleeve 44. Threaded member 48 may be a power screw or other mechanism that translates rotational motion into linear motion, such as a ball screw, roller screw, or other such devices that are known in the art. Bearings 46 are retained by stationary housing 28 and allow rotation of sleeve 44 relative to the stationary housing and valve body 12. Transmission 50 operatively couples motor 52 to rotating sleeve 44. Stem housing 54 is fixably coupled to rotating sleeve 44.

Valve 10 is actuated, i.e., moved between its open position and its closed position, by axially translating stem 38 so as to shift the position of closure member 34. Stem 38 is axially translated by actuation of rotating sleeve 44 and rotating threaded member 48. The rotation of threaded member 48 causes axial translation of threaded stem 40, which translates in unison with stem 38, closure member 34, and balance stem 36. Valve 10 may also be actuated by applying torque to stem housing 54, independent of the motor 52 and transmission 50 or in conjunction therewith. As one example, the stem housing may be actuated by a remotely operated vehicle if the motor were to fail or needed additional assistance, for instance.

In an automated mode, sleeve 44 is rotated by activating motor 52 so as to provide rotational energy to transmission 50. Transmission 50 transfers rotational energy from motor 52 to sleeve 44 so that the activation of the motor results in rotation of the sleeve. In certain embodiments, transmission 50 is designed to minimize the torque or speed requirements of motor 52. Motor 52 may be a hydraulic, electric, pneumatic, or any other rotating motor.

Valve system 10 includes one or more position sensors 55, such as Hall-effect sensors or the like, to detect the position of the closure member 34 with respect to the bore 24. These position sensors 55 communicate with an automated controller or with a user interface located at a remote position, for example. Additionally, the valve system 10 is in communication with control circuitry that allows for the control of the valve 10 from a remote location. In fact, by controlling current to the motor, the position of the closure member can be manipulated remotely.

Balance stem 36 has the same diameter as stem 38 so that pressure forces are balanced across closure member 14. When the pressure forces acting on closure member 14 are not balanced, the differential pressure generates an axial force on stem 38, which may affect the operation of actuator system 16. In certain embodiments, valve 10 may not include balance stem 36 so as to take advantage of the pressure imbalance.

Figure 2:
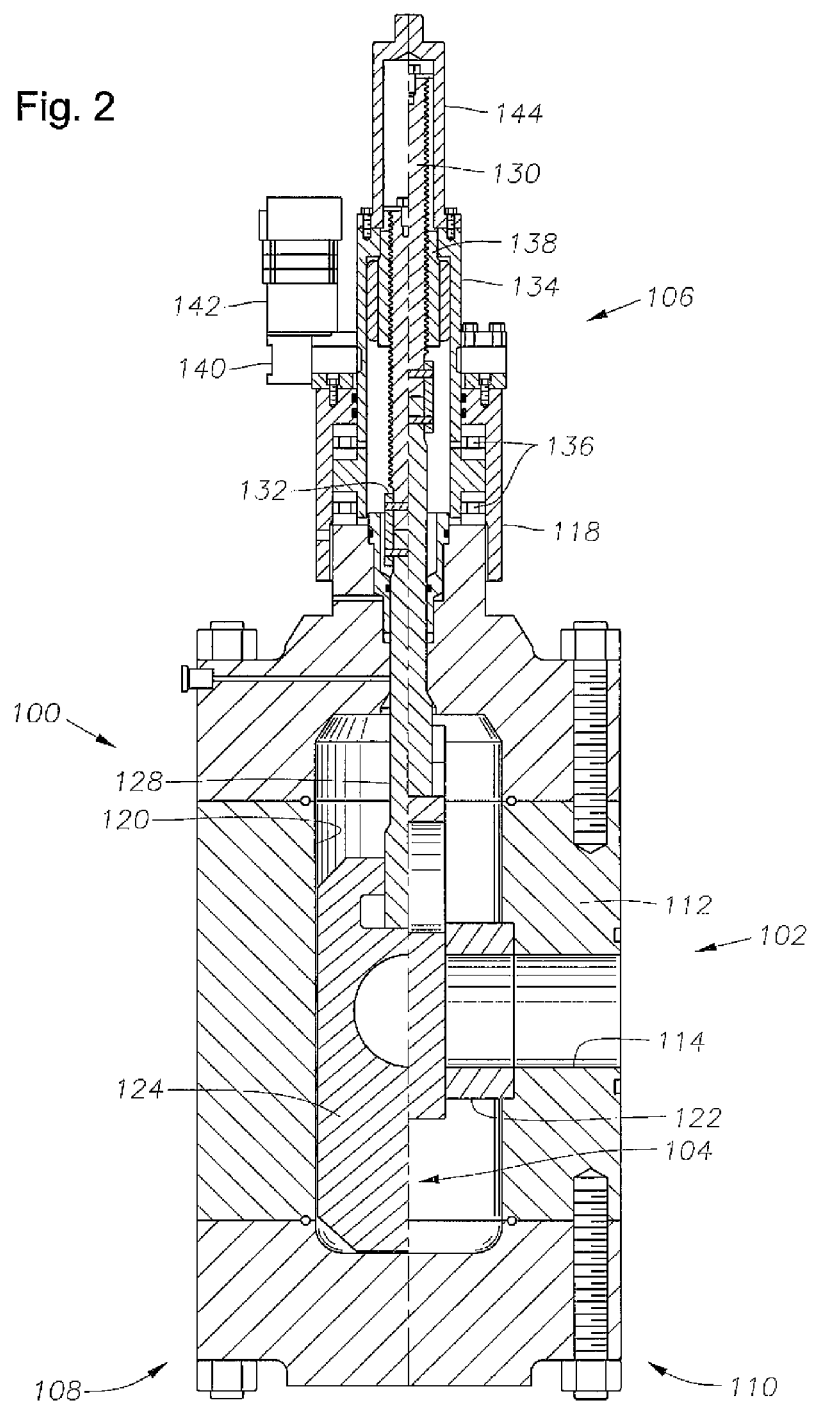
FIG. 2 is a partial sectional view of a valve assembly comprising a self-locking transmission constructed in accordance with embodiments of the invention.

Referring now to FIG. 2, valve system 100 is similar to valve system 10 but does not include a balance stem 36. Valve system 100 comprises valve body 102, closure assembly 104, and actuator system 106. Closure assembly 104 is shown in an open position on the left half 108 of FIG. 2 and in a closed position on the right half 110 of FIG. 2. The two halves of FIG. 2 are also shown ninety degrees opposed. Valve body 102 comprises body 112 having bore 114 extending therethrough. Coupled to one end of body 112 is stationary housing 118. Closure assembly 104 comprises closure member 124 and valve seat 122, both of which are disposed within valve cavity 120 in body 112.

Actuator system 106 is coupled to stationary housing 118 and comprises threaded stem 130, coupling 132, rotating sleeve 134, bearings 136, threaded member 138, transmission 140, motor 142, and stem housing 144. Threaded stem 130 is connected to actuator stem 128 by coupling 132. Threaded stem 130 is engaged with threaded member 138, which is rotationally fixed relative to rotating sleeve 134. Bearings 136 are retained by stationary housing 118 and allow rotation of sleeve 134 relative to the stationary housing and valve body 102. Transmission 140 operatively couples motor 142 to rotating sleeve 134. Stem housing 144 is fixably coupled to rotating sleeve 134.

As discussed above in reference to valve system 10 of FIG. 1, balance stem 36 serves to eliminate a pressure imbalance across closure member 124. Valve system 100 does not use a balance stem so as to take advantage of this pressure imbalance so as to bias closure member 124 to the closed position. In order to counteract the biasing force, transmission 140 is a self-locking transmission that will not rotate unless motor 142 also rotates.

Because of the biasing force, motor 142 is designed to generate sufficient power to overcome the pressure differential across closure member 124 while moving the closure member to the closed position. Conversely, actuator system 106 requires very little, if any, power output from motor 142 to move closure member 124 to the open position. The low power requirement allows valve 100 to be opened by actuator system 106 being operated by a system providing limited power, such as may be provided by a remotely operated vehicle in an emergency situation.

Figure 3:
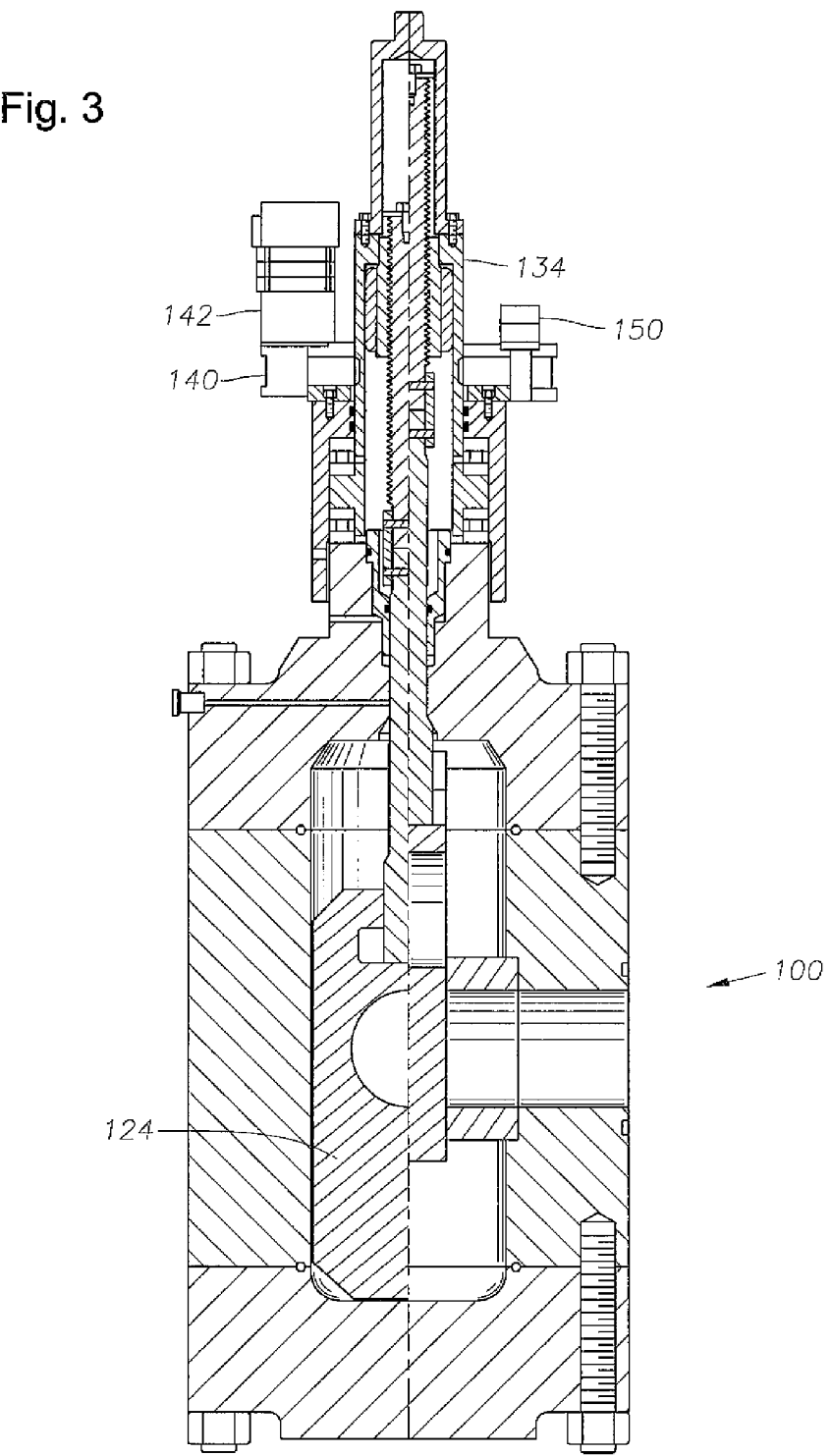
FIG. 3 is a partial sectional view of a valve assembly comprising a clutch constructed in accordance with embodiments of the invention.

FIG. 3 shows valve system 100 further comprising a clutch mechanism 150 that is coupled to transmission 140. Clutch mechanism 150 operates to selectively de-couple motor 142 and transmission 140 from rotating sleeve 134. For example, clutch mechanism 150 would operate in a default engaged mode where motor 142 and transmission 140 are engaged with rotating sleeve 134. To close valve 100, such as in an emergency mode, clutch mechanism 150 would activate so that sleeve 134 would be free to rotate in response to the rotation of threaded member 138 as threaded stem 130 moves axially in response to the pressure acting on closure member 124 and stem 128.

Figure 4:
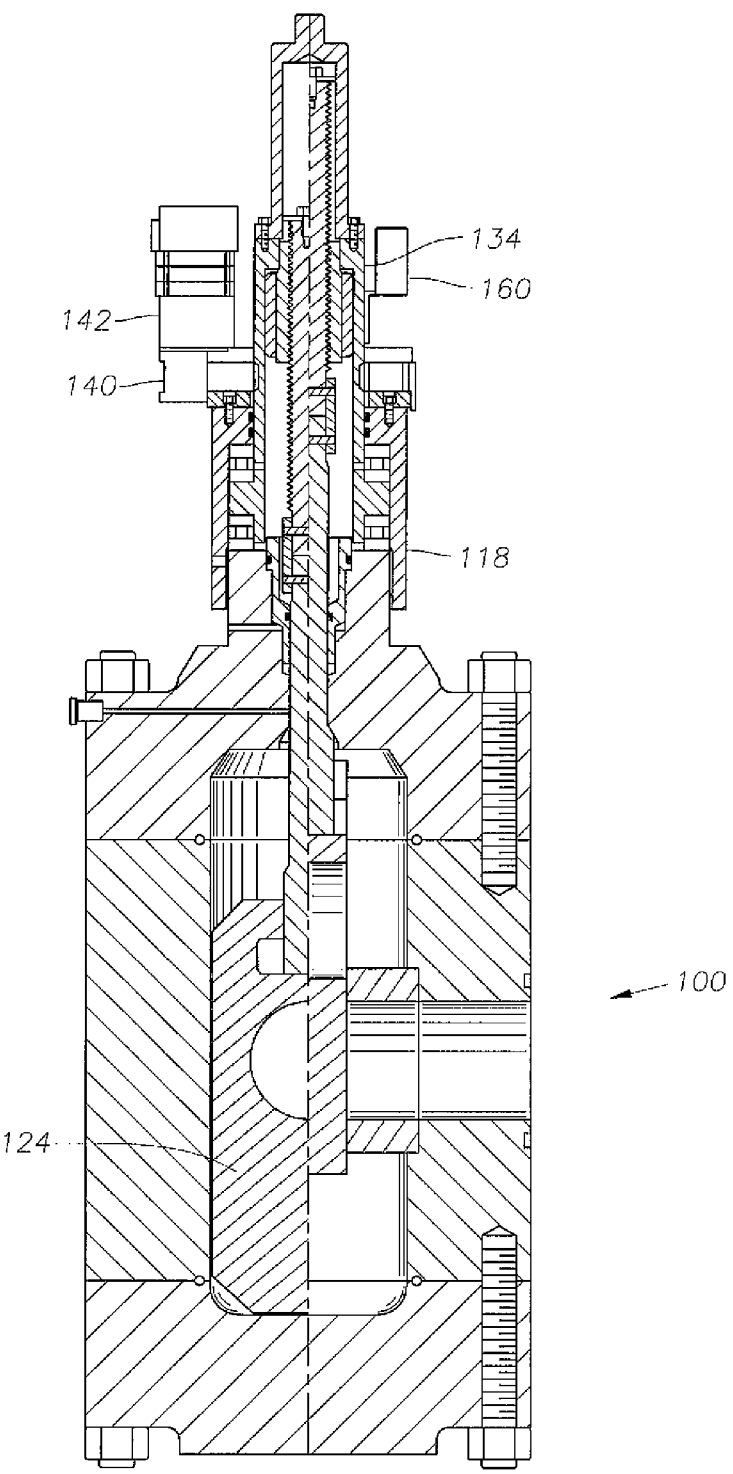
FIG. 4 is a partial sectional view of a valve assembly comprising a wrap spring clutch constructed in accordance with embodiments of the invention.

FIG. 4 shows valve system 100 further comprising wrap spring clutch 160 that is coupled to rotating sleeve 134 and stationary housing 118. Wrap spring clutch 160 allows rotating sleeve 134 to rotate in one direction relative to stationary housing 118 but prevents rotation in the opposite direction while the wrap spring clutch is engaged. For example, wrap spring clutch 160 could be arranged such that rotating sleeve 134 can rotate as closure member 124 is moved to the open position. Wrap spring clutch 160 would prevent rotating sleeve 134 from rotating in the opposite direction, effectively preventing closure member 124 from moving away from the open position. Once wrap spring clutch 160 is released, rotating sleeve 134 can freely rotate, thus allowing the pressure acting on stem 128 to move the closure member 124 to the closed position. Wrap spring clutch 150 could be remotely released or could be designed to release in the event of loss of control so that valve system 100 would be a fail-safe close valve.

Figure 5:
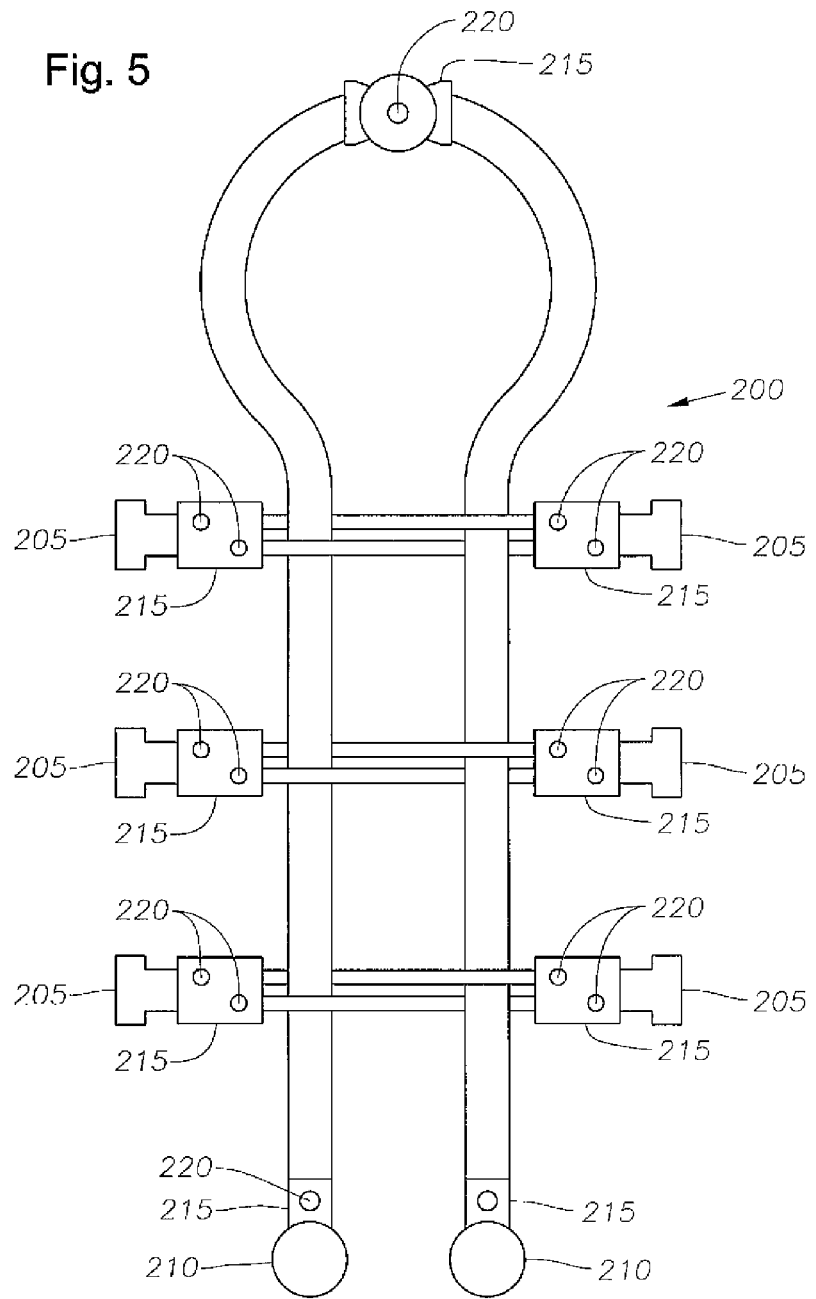
FIG. 5 is a schematic view of a manifold including valves constructed in accordance with embodiments of the present invention.

FIG. 5 is a schematic illustration of a subsea manifold 200 including a plurality of satellite well connections 205 and a pair of pipeline connections 210. Subsea manifold 200 receives produced fluids through well connections 205 from multi-well templates or satellite wells in order to control, commingle and divert the flow to pipeline, or a production riser, through pipeline connections 210. A plurality of valve assemblies 215 controls the flow through manifold 200 in order to isolate single wells, or groups of wells, as needed for testing, maintenance, or other production reasons.

As each valve assembly 215 has at least one operator 220, providing rotary actuators, as described above, greatly reduces the complexity of the components needed to operate manifold 200. The minimum torque and speed requirements of the motors needed to operate the actuators described herein allow for the use of substantially less hydraulic or electric power than is required in conventional systems. For example, a 6.375" diameter –15,000 psi gate valve could be operated with a 0.5 horsepower rotary actuator that, in combination with the actuators described herein, can fully open or close the valve within one minute. This rotary actuator could be an electric, hydraulic, or pneumatic actuator, depending on the requirements of the system in which the valve is used.

While exemplary embodiments of this invention have been shown and described, modifications thereof can be made by one skilled in the art without departing from the scope or teaching of this invention. Again, the embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the override apparatus retain the advantages discussed herein. Further, the actuators described herein may be suitable for being retrofitted onto existing valves to replace conventional hydraulic, or other types of, actuators, and therefore may be constructed independently of the valve components. Accordingly, the scope of protection is not limited to the embodiments described herein, but is only limited by the claims that follow, the scope of which shall include all equivalents of the subject matter of the claims.

What is claimed is:

1. A valve actuator for a valve body, comprising:
   a housing fixably coupled to the valve body;
   a sleeve comprising a first end rotatably coupled to said housing in two directions and a second end projecting out of said housing;
   a valve stem partially disposed within said sleeve and extending into the valve body;
   a screw member coupled to said valve stem and said sleeve so that rotation of said sleeve causes translation of said valve stem;
   a transmission coupled to said housing and engaged with said sleeve;
   a motor coupled to said transmission so that operation of said motor causes rotation of said sleeve;
   said motor being configured to rotate the sleeve and said sleeve being configured to be rotated by the motor in both directions to translate said valve stem back and forth between a first position and a second position; and
   wherein said sleeve is configured to rotate both with and independently of the operation of said motor to translate said valve stem while remaining operatively coupled to said motor.

2. The valve actuator of claim 1, wherein said screw member is a ball screw.

3. The valve actuator of claim 1, wherein said screw member is a roller screw.

4. The valve actuator of claim 1, wherein said motor is an electric motor.

5. The valve actuator of claim 1, wherein said motor is a hydraulic or pneumatic motor.

6. The valve actuator of claim 1, further comprising a clutch mechanism that selectively de-couples said motor from said screw member.

7. The valve actuator of claim 1, wherein said transmission is self-locking.

8. The valve actuator of claim 1, further comprising:
   a stem housing separate from said transmission and fixed to said second end of said sleeve; and
   wherein said sleeve is configured to rotate both with and independently of the operation of said motor and said transmission by rotating said stem housing directly.

9. A valve comprising:
   a closure member moveably disposed within a valve body;
   a sleeve rotatable relative to said valve body in two directions;
   an actuator stem coupled to said closure member and extending through said valve body;
   a threaded stem coupled to said actuator stem and translatable within said sleeve;
   a screw member disposed within said sleeve such that rotation of said sleeve results in axial translation of said threaded stem;
   a transmission engaged with said sleeve;
   a motor operatively coupled to said screw member by said transmission so that operation of said motor causes rotation of said screw member;
   said motor being configured to rotate the sleeve and said sleeve being configured to be rotated by the motor in both directions to translate said actuator stem back and forth between a first position and a second position; and
   wherein said sleeve is configured to rotate both with and independently of the operation of said motor and said transmission to translate said actuator stem while remaining operatively coupled to said motor.

10. The valve of claim 9 further comprising a stationary housing coupled to the valve body, wherein sleeve is rotatably coupled to said stationary housing.

11. The valve of claim 10, further comprising a wrap spring clutch coupled to said stationary housing and the sleeve such that, when said wrap spring clutch is engaged, the sleeve can only rotate in one direction relative to said stationary housing.

12. The valve of claim 10, wherein:
   said sleeve extends and is engaged with said transmission outside of said stationary housing; and
   said sleeve is configured to rotate both with and independently of the operation of said motor by engagement of the portion of said sleeve extended outside of said stationary housing.

13. The valve of claim 9, wherein said screw member is a ball screw or a roller screw.

14. The valve of claim 9, wherein said motor is an electric motor or a hydraulic or pneumatic motor.

15. The valve of claim 9, further comprising a clutch mechanism that selectively de-couples said motor from said screw member.

16. The valve of claim 9, wherein said transmission is self-locking so that said screw member does not rotate independently of said motor.

17. The valve of claim 9, further comprising a means separate from said transmission and fixed to said sleeve for rotating said sleeve independently of the operation of said motor and said transmission.

18. A method for actuating a valve comprising:
 providing a valve actuator comprising:
  a sleeve comprising a first end rotatably coupled in both directions to the valve;
  a valve stem threadedly coupled to said sleeve and coupled to a closure member disposed within the valve;
  a motor operatively coupled to said sleeve via a transmission so as to be configured to rotate the sleeve in both directions; and
  said sleeve being configured to rotate both with and independently of the operation of said motor and said transmission while remaining operatively coupled to said motor; and
 actuating said closure member between a first position and a second position by operating said motor so as to cause rotation of said sleeve and axial translation of said valve stem.

19. The method of claim 18 further comprising actuating said closure member from the second position to the first position by operating said motor so as to cause rotation of said sleeve and axial translation of said valve stem.

20. The method of claim 18 further comprising actuating said closure member by releasing a clutch mechanism so as to de-couple said motor from said sleeve so that differential pressure across said closure member will move said closure member.

21. The method of claim 18, further comprising rotating said sleeve directly to actuate said closure member independently of the operation of said motor and said transmission.

* * * * *